Jan. 12, 1926.
C. A. RANCIER
1,569,827
ANIMAL TRAP
Filed Oct. 17, 1924
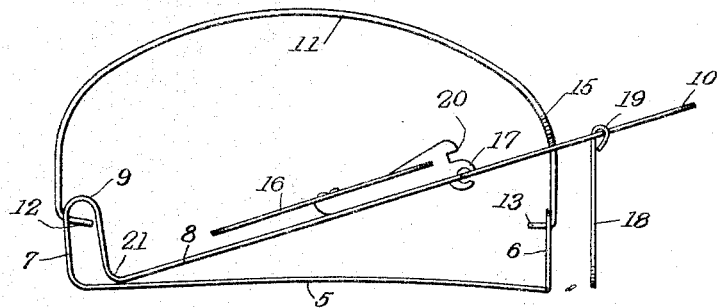
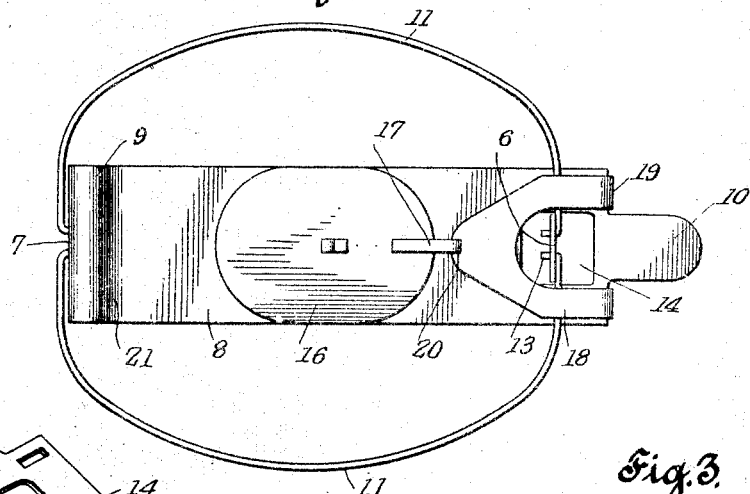
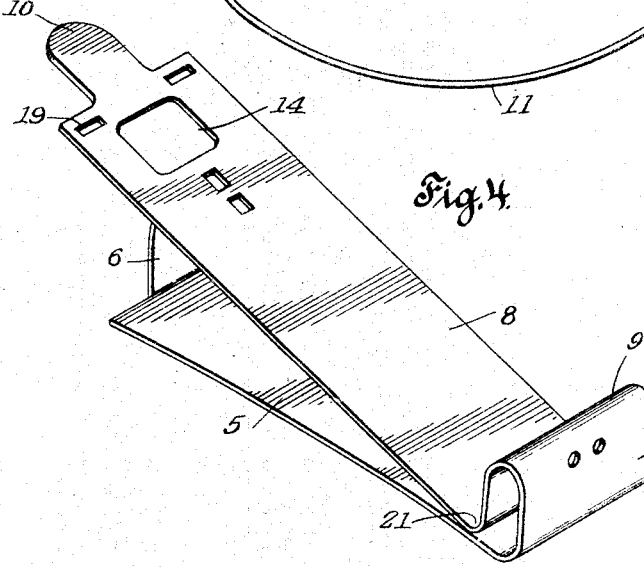
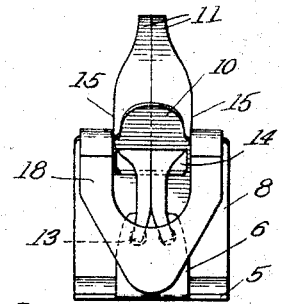
INVENTOR
Charles A. Rancier
BY
ATTORNEY Patented Jan. 12, 1926.

1,569,827

UNITED STATES PATENT OFFICE.

CHARLES AGUSTUS RANCIER, OF BROOKLYN, NEW YORK, ASSIGNOR OF ONE-HALF TO WILLIAM J. BOEHMER.

ANIMAL TRAP.

Application filed October 17, 1924. Serial No. 744,101.

*To all whom it may concern:*

Be it known that I, CHARLES AGUSTUS RANCIER, a citizen of the United States of America, residing at borough of Brooklyn, county of Kings, State of New York, have invented a new and useful Animal Trap, of which the following is a specification.

The main object of my invention is to provide an efficient, small, and inexpensive trap of the swinging-jaw type.

Another object is to provide a jump-type trap of simple, reliable, and inexpensive construction.

In carrying out the invention in a simple form only five elements are required, namely, the combination base and spring element, the two swinging jaws pivotally carried thereby, a pan or bait plate which may be made of one or two parts, and a latch.

Figure 1 is a side view of a trap embodying the improvements of my invention, the jaws being shown closed.

Figure 2 is a plan view of the same, jaws extended.

Figure 3 is an edge view looking from the right of Figure 1.

Figure 4 is a perspective view of the supporting spring element.

The base consists of the bar 5 with upturned ends 6 and 7, preferably integral therewith. The arm 8 is integrally connected with the upright 7 by a reversely bent part 9. The outer end 10 of the part 8 serves as a finger piece or handle.

The jaws 11 are provided with inwardly-turned pivoted ends 12 and 13, pivoted in the uprights 6 and 7. One end of each extends through an opening 14 in the arm 8 and is provided with a shoulder 15 which serves as a stop or abutment for the edges of the arm on opposite sides of the opening.

The bait pan or plate 16 is pivoted at 17 to the arm 8. The latch 18 is pivoted to the arm 8 and adapted to interlock with the tongue 20 on the pan 16 when the parts are in the position shown in Figure 2 and the jaws 11 are extended.

The base 5 and arm 8 constitute the spring or throwing member. Preferably the base is arched somewhat and the arm 8 is provided with a shoulder 21 adapted to impinge upon the base when the arm 8 is compressed and the latch 18 is caught as shown in Figure 2.

To set the trap it is simply necessary to press down on the end 10 of the arm 8, spread the jaws 11, and then throw over the latch 18 and catch it as shown in Figure 2. When the pan 16 is depressed it disengages the catch 20 from the latch 18 and thus releases the spring which tries to take up its normal position. This causes the trap to jump from the ground so that the jaws grip the game at a maximum height.

It will be seen that the construction is not only simple to make but is small and compact and contains but a few parts.

I claim:

1. An animal trap comprising a combined spring member having a base, two uprights, and an overhead arm connected to one of the uprights, jaws having pivot ends extending inwardly toward each other and pivoted in said uprights, a pan hinged to the central part of said arm, and a latch hinged to the outer end of said arm and adapted to overlie both of said jaws near their pivotal ends when said jaws are spread, said jaws having shoulders engaged by said arm.

2. An animal trap comprising a base having uprights, jaws, pivotally carried by said uprights, a spring arm carried by one of said uprights at one end and having an opening at its opposite end for said jaws, a pan pivotally carried by said arm, and a latch pivotally carried by the outer end of said arm having portions engaging both of said jaws to hold them when spread apart, said pan having a catch shoulder which may be engaged by the outer end of said latch, said jaws having shoulders engaged by said arm.

3. An animal trap comprising a combined member consisting of an arched spring base and a spring arm connected thereto at one end, jaws hinged to said base, said arm and jaws having cooperating shoulders, a latch hinged to said arm near its outer end, and a pan hinged to said arm between said jaws and having a catch shoulder to be engaged by said latch, said latch being adapted to co-act with adjacent ends of both of said jaws when said jaws are spread.

4. An animal trap comprising a combined base and spring, said base having uprights and an integral reversely bent portion connecting said arm and one of said uprights, said portion being adapted to engage said base when said arm is compressed, jaws hinged to said uprights, a pan hinged to said arm, and a latch hinged to said arm and adapted to engage said pan and adapted to engage and hold both of said jaws when spread apart.

5. A trap comprising an arched spring base having upturned ends, jaws hinged in said ends, a spring arm connected to one of said ends and having a shoulder near thereto adapted to engage said spring base when said spring arm is depressed, a bait pan hinged to said spring arm at a point which is near the opposite ends of said base when said arm is depressed, said arm having an opening through which parts of said jaws pass and portions of said arm at the edges of said opening engaging said jaws to close them, and a latch pivoted to the outer end of said spring arm and adapted to overlie and hold both jaws and to be interlocked with a part of said pan.

6. A trap comprising a base having upturned ends, jaws hinged in said ends, a spring arm connected to one of said ends, a bait pan hinged to said spring arm at a point which is near the opposite end of said base when said arm is depressed, said arm having an opening through which parts of said jaws pass and portions of said arm at the edges of said opening engaging said jaws to close them, and a latch pivoted to the outer end of said spring arm and adapted to overlie and hold both jaws and to be interlocked with a part of said pan.

CHARLES AGUSTUS RANCIER.